United States Patent
Yagi et al.

[11] Patent Number: 5,835,652
[45] Date of Patent: Nov. 10, 1998

[54] OPTICAL FIBER CABLE CONNECTOR

[75] Inventors: Masonori Yagi, Ebina; Hiroyuki Fujii, Yokohama, both of Japan

[73] Assignee: Molex Incorporated, Lisle, Ill.

[21] Appl. No.: 722,590

[22] Filed: Sep. 27, 1996

[30] Foreign Application Priority Data

Oct. 26, 1995 [JP] Japan ..................... 7-302180

[51] Int. Cl.⁶ ..................................................... G02B 6/38

[52] U.S. Cl. .................. 385/87; 385/136; 385/99; 385/95; 385/70; 385/77

[58] Field of Search ................... 385/56, 58, 70, 385/77, 86, 87, 136, 137, 95, 99

[56] References Cited

U.S. PATENT DOCUMENTS

| | | | |
|---|---|---|---|
| 3,705,756 | 12/1972 | Keller et al. | 385/87 |
| 4,986,625 | 1/1991 | Yamada et al. | 350/96 |
| 5,044,719 | 9/1991 | Nakamura | 385/76 |

FOREIGN PATENT DOCUMENTS

| | | | |
|---|---|---|---|
| 01517346A1 | 12/1992 | European Pat. Off. | G02B 6/38 |
| 0248902B1 | 4/1993 | European Pat. Off. | G02B 6/38 |

*Primary Examiner*—John Ngo
*Attorney, Agent, or Firm*—A. A. Tirva

[57] ABSTRACT

Disclosed is an improved optical fiber cable connector having at least one pair of ramp projections inclined inward to engage an optical fiber cable for preventing removal of the cable from the connector by a pulling force applied to the cable.

10 Claims, 9 Drawing Sheets

OPTICAL FIBER CABLE CONNECTOR

FIELD OF THE INVENTION

The present invention relates to an optical fiber cable connector, and more particularly, to an improvement in or relating to a cable holder to be inserted into the connector housing.

BACKGROUND OF THE INVENTION

As is well known, optical fiber cable connectors are used for terminating optical fiber cables for coupling to other optical fiber cables which are terminated by mating optical fiber cable connectors. Japanese Utility Model Application Laid-Open Nos. 5-59412 and 1-177708 shows an optical fiber cable connector which comprises a housing having at lease one cable insertion aperture for inserting an optical fiber cable, a holder slot extending along the cable insertion aperture, and at least one cable holder including a ceiling plate, and two opposite side walls integrally connected to the opposite longitudinal edges of the ceiling plate, each having cable gripping means to engage an optical fiber cable by penetrating the jacket of the optical fiber cable.

The cable holder has an inverted "U"-shape for pushing and holding an optical fiber cable in the cable insertion aperture.

A disadvantage of the inverted "U"-shaped holder is that it cannot hold an optical fiber cable against a relatively strong pulling force applied to the optical fiber cable, thus allowing the cable to be removed from the holder.

SUMMARY OF THE INVENTION

One object of the present invention is to provide an optical fiber cable connector whose cable holder can grip an optical fiber cable against a strong pull of the optical fiber cable.

To attain this object an optical fiber cable connector has a housing including at lease one cable insertion aperture for inserting aperture, and at lease one cable holder including a ceiling plate and two opposite side walls integrally connected to the opposite longitudinal edges of the ceiling plate. Each side wall has cable gripping means to engage the optical fiber cable by penetrating into the jacket of the optical fiber cable at least one pair of ramp projections inclined inward in the direction opposite to the direction in which the optical fiber cable may be pulled.

The cable gripping means may include two pairs of ramp projections arranged back and forth in the longitudinal direction, one and the other pair of ramp projections converging in opposite directions.

The cable gripping means may include two pairs of ramp projections arranged back and forth in the longitudinal direction, one and the other pair of projections converging toward each other.

The cable gripping means may include two pairs of ramp projections arranged back and forth in the longitudinal direction, one and the other pair of ramp projections converging in one and same direction.

These arrangements have the effect of increasing the resistance against a pulling force applied to an optical fiber cable, thus preventing the removal of the optical fiber cable from the connector.

The cable holder may be made of metal. The metal holder permits the stamping-out of cable gripping means from the opposite side walls of the inverted "U"-shaped holder. The cable holder may also be made of plastics and thus can be easily molded.

Each ramp projection may have a guide surface inclined downward to the adjacent side wall. This facilitates the inserting of the inverted "U"-shaped holder in the connector housing with its opposite side walls located close to the opposite sides of the optical fiber cable.

The cable holder may have detents projecting from the front and rear edges of each side wall to engage the front and rear walls of the holder slot of the housing thereby anchoring the cable holder in the holder slot.

The cable holder may also have at least one pair of cantilever-like projections extending from the opposite side walls for engaging and holding the jacket of the optical fiber cable.

The optical fiber cable may be all plastic fiber cable.

Other objects and advantages of the present invention will be understood from the following description of preferred embodiments of the present invention, which are shown in accompanying drawings.

DETAILED DESCRIPTION OF THE PREFERRED EMBODIMENTS

Figure 13:
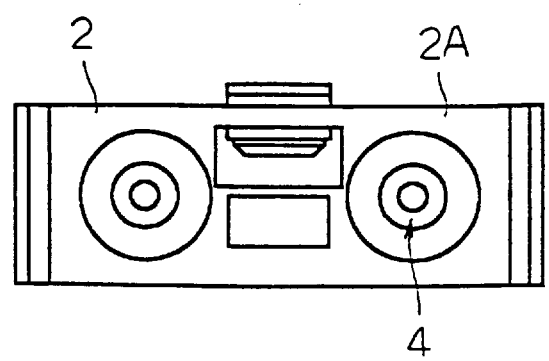
FIG. 13 is a front view of the optical fiber cable connector.
Figure 15:
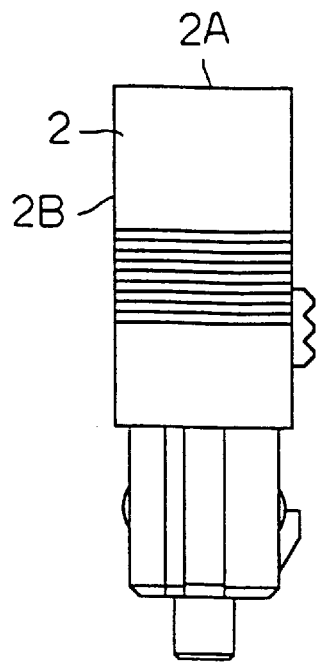
FIG. 15 is a side view of the optical fiber cable connector.
Figure 14:
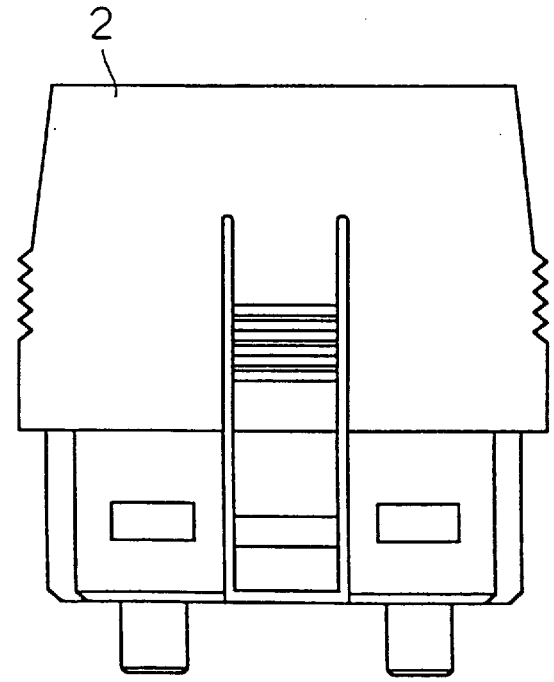
FIG. 14 is a bottom view of the optical fiber cable connector.
Figure 16:
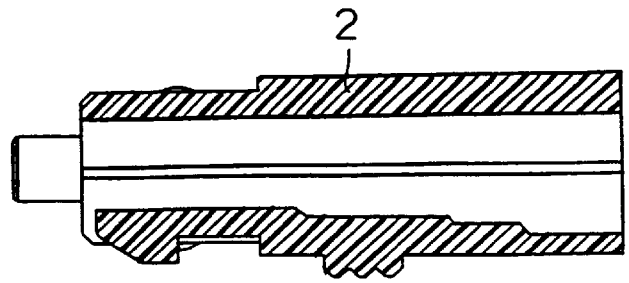
FIG. 16 is a longitudinal section of the optical fiber cable connector taken along the line E—E in FIG. 11.
Figure 17:
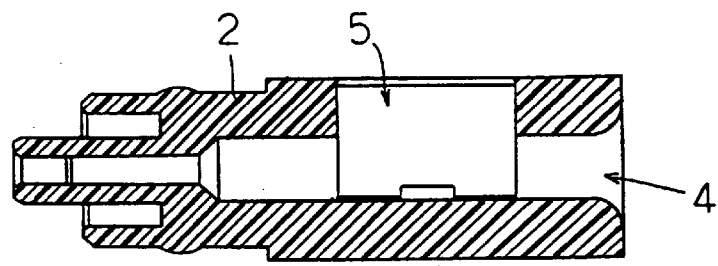
FIG. 17 is a longitudinal section of the optical
Figure 18:
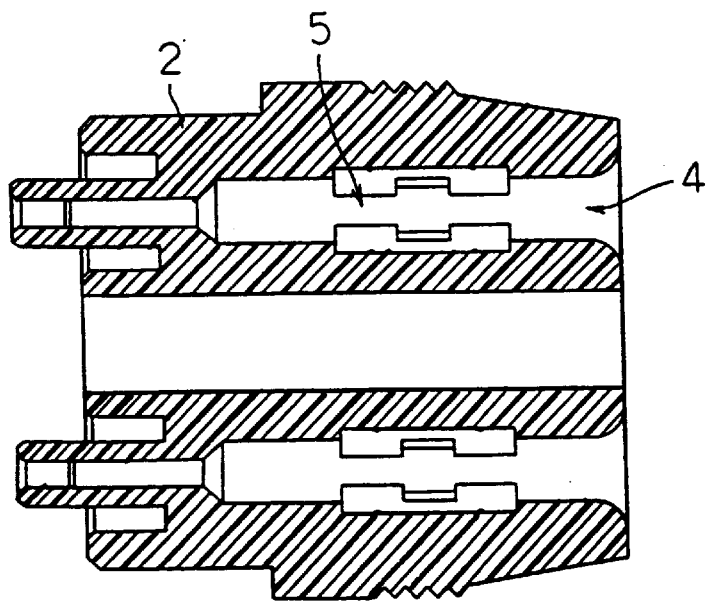
FIG. 18 is a longitudinal section of the optical fiber cable connector taken along the line F—F in FIG. 12.

FIGS. 1 to 18 show an optical fiber cable connector according to a first embodiment of the present invention. It includes a housing 2 and a cable holder 3. The housing 2 has two cable insertion apertures 4 for inserting optical fiber cables 6 and holder slots 5 extending along these cable insertion apertures 4, as best shown in FIG. 11. The two cable insertion apertures 4 run parallel, as best shown in FIG. 18. These cable insertion apertures 4 are open on the front side 2A of the housing 2, as shown from FIG. 13. The holder slots 5 for accommodating cable holders 3 are open on the top side 2B of the housing 2, as shown in FIG. 11. These holder slots 5 communicate with the associated cable insertion apertures 4.

Figure 7:
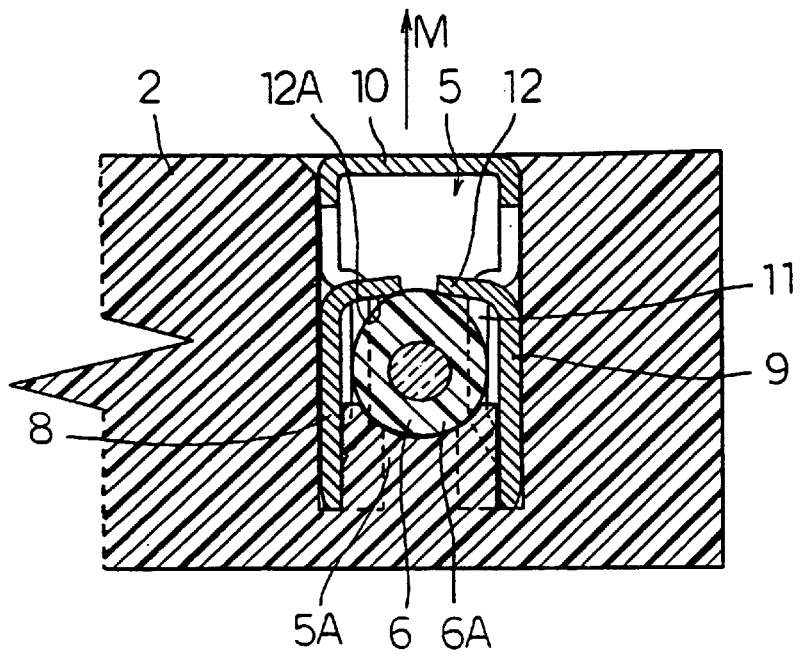
FIG. 7 is a cross section of the cable holder taken along the line B—B in FIG. 3.
Figure 8:
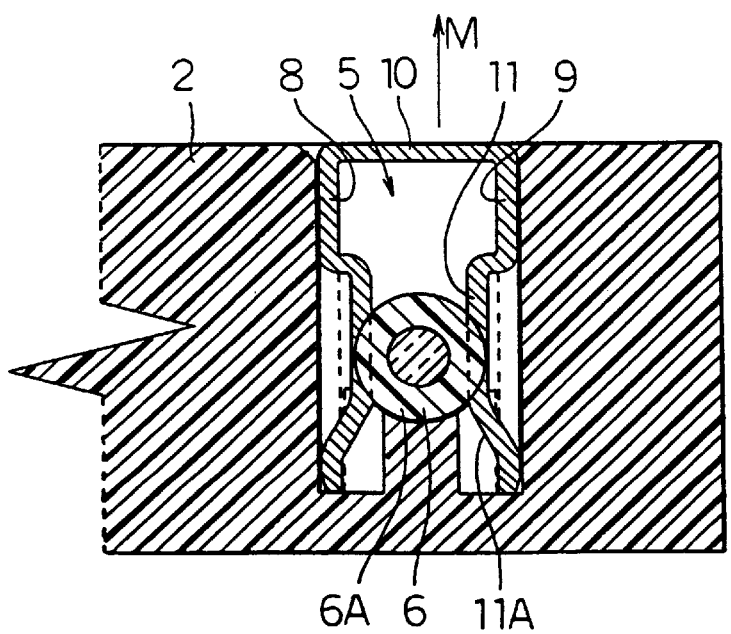
FIG. 8 is a cross section of the cable holder taken along the line C—C in FIG. 3.
Figure 9:
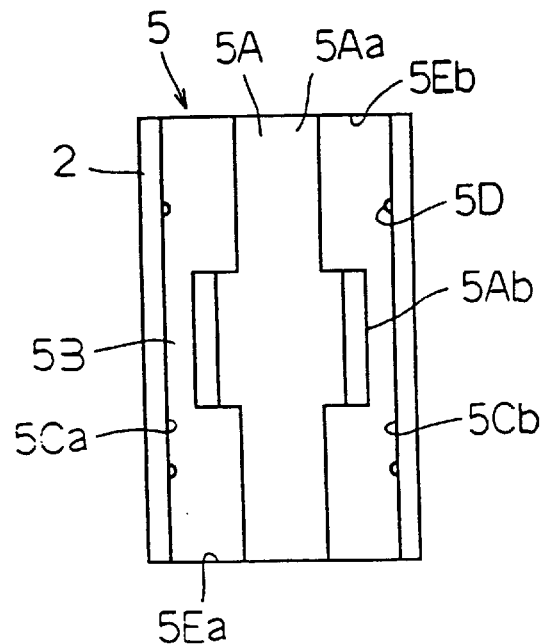
FIG. 9 is a top view of the holder slot in the optical fiber connector according to the first embodiment.
Figure 10:
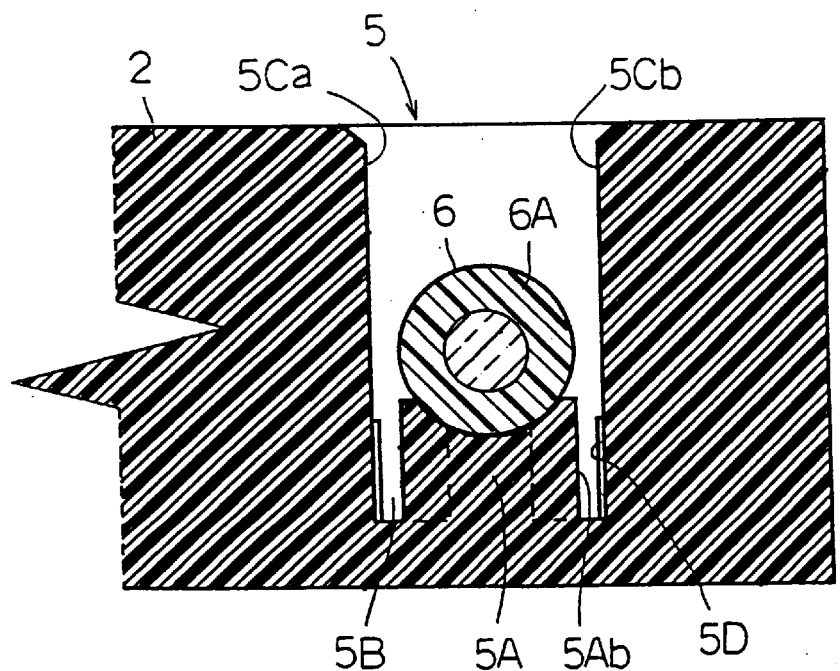
FIG. 10 is a cross section of the optical fiber cable connector taken along the line J—J in FIG. 11.
Figure 11:
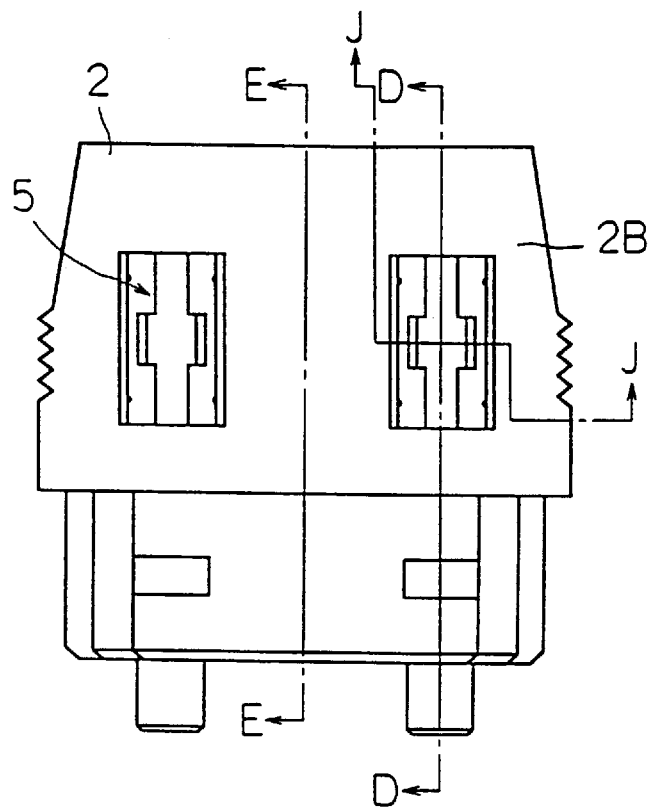
FIG. 11 is a top view of the optical fiber cable connector according to the first embodiment.
Figure 12:
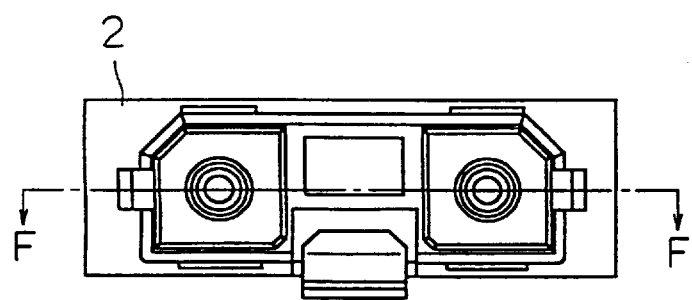
FIG. 12 is a rear view of the optical fiber cable connector.

As shown in FIGS. 7, 8 and 10, the holder slot 5 is rectangular in cross section and has a cable strap 5A integrally connected to the bottom of the rectangular slot 5. The cable stay 5A has a concave tap 5Aa to accommodate the round optical fiber cable 6. The cable stay 5A has slots 5B on its opposite sides permitting the fitting-in of the opposite side walls 8 and 9 of an inverted "U"-shaped cable holder 3 (later described in detail). As seen from FIGS. 9 and 10, vertical ridges 5D are formed on the opposite side walls 5Ca and 5Cb of the holder slot 5 for pushing the outer surfaces 8A and 9A of the opposite side walls 8 and 9 of the inverted "U"-shaped cable holder 3 against the opposite sides 5Ab of the cable stay 5A when the cable holder 3 is inserted in the holder slot 5.

As shown in FIGS. 1, 2, 3 and 4, the cable holder 3 includes ceiling plate 10, and two opposite side walls 8 and 9 integrally connected to the opposite longitudinal edges of the ceiling plate 10.

Each side wall has cable gripping means to engage the optical fiber cable 6 by penetrating the jacket t6A of the optical fiber cable 6.

The structure described so far is found in the conventional optical fiber connector described earlier. The central feature of the present invention resides in the cable gripping means including at least one pair of ramp projections 11 projecting from the opposite side walls 8 and 9, and inclined inward in the direction opposite to the direction "N" in which the optical fiber cable 6 is pulled.

Figure 1:
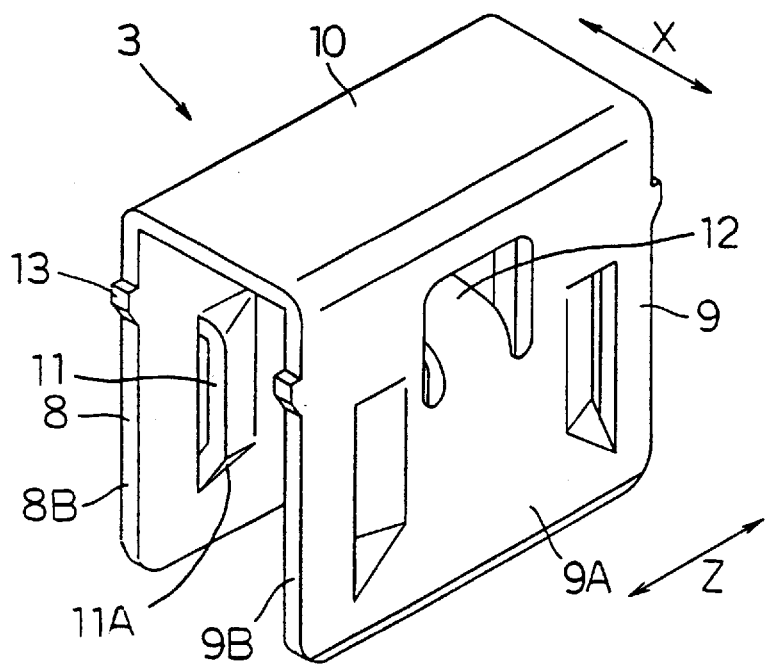
FIG. 1 is a perspective view of the cable holder of an optical fiber connector according to a first embodiment of the present invention.
Figure 2:
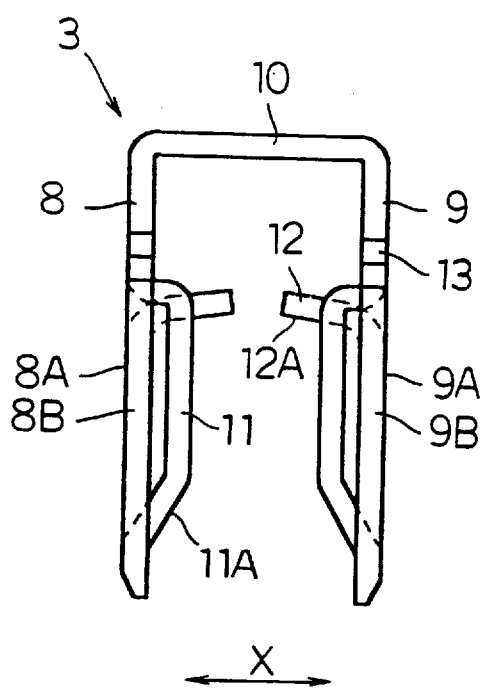
FIG. 2 is a front view of the cable holder.
Figure 3:
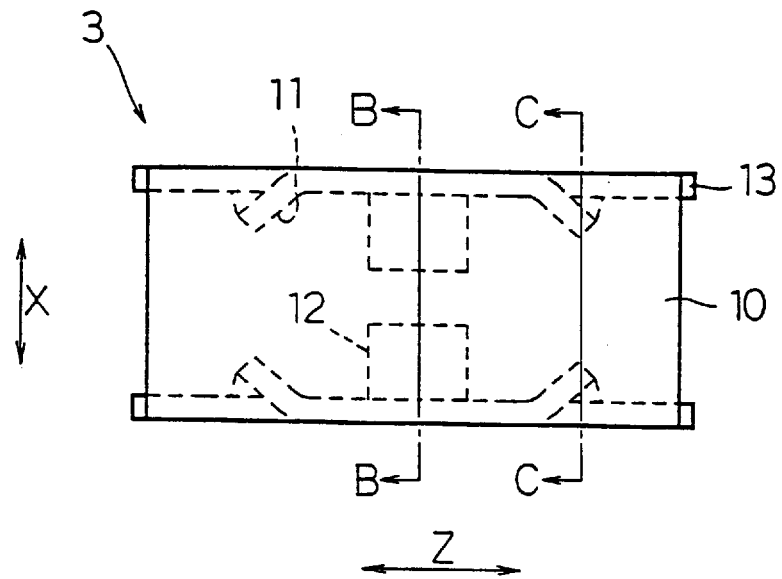
FIG. 3 is a top view of the cable holder.
Figure 4:
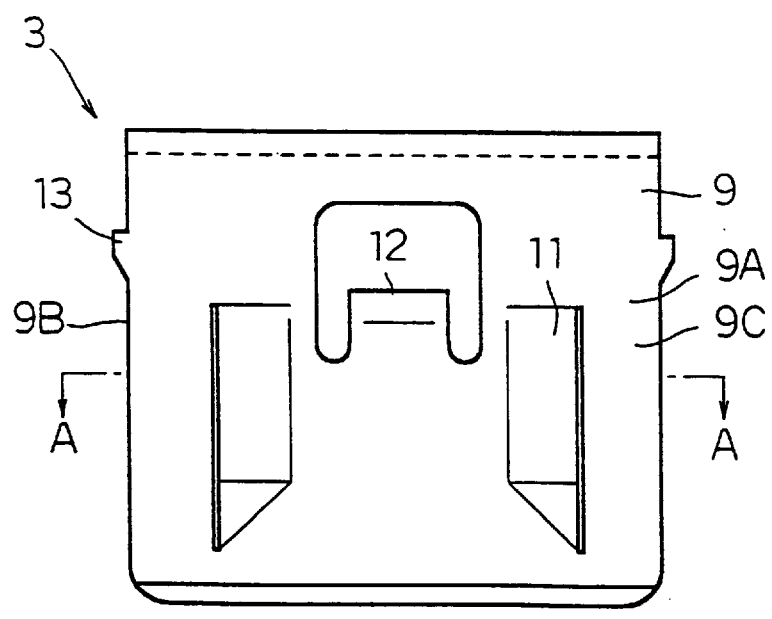
FIG. 4 is a side view of the cable holder.
Figure 5:
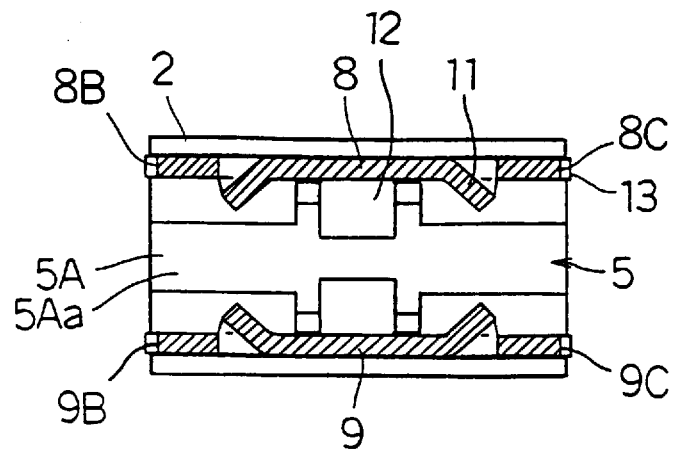
FIG. 5 is a longitudinal section of the cable holder taken along the line A—A in FIG. 4.
Figure 6:
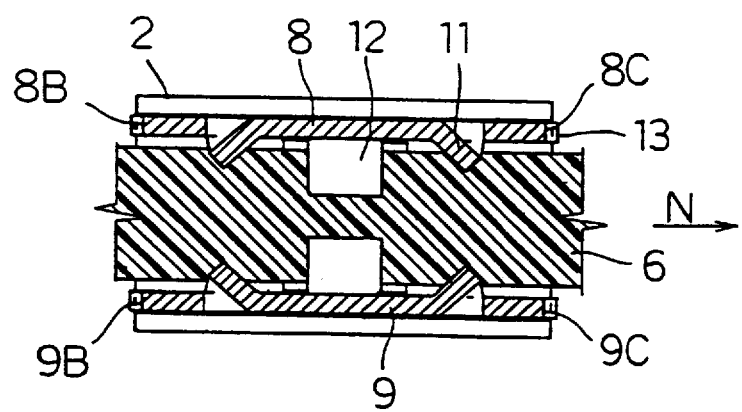
FIG. 6 is a similar longitudinal section of the cable holder, but showing it as having an optical fiber cable inserted.

As shown in FIG. 1, two pairs of forward and rearward ramp projections 11 are formed in the longitudinal direction "Z" by cutting and projecting the cut portions from the opposite side walls 8A and 9A so that these two pairs of ramp projections may converge in the opposite directions specifically one pair of ramp projections 11 are at angle in the direction opposite to the direction "N" on which the optical fiber cable 6 is pulled whereas the other pair of ramp projections 11 are at angle in the pulling direction "N", as best seen in FIGS. 5 and 6.

The ramp projection 11 has a guide surface 11A inclined downward to its respective side wall 8 or 9, thereby facilitating the guiding of the cable holder 3 to the opposite sides of the optical fiber cable 6 when the cable holder 3 is inserted in the holder slot 5 of the housing 2.

Also, the cable holder 3 has one pair of cantilever-like projections 12 extending from the opposite side walls 8 and 9 between the forward and rearward ramp projections 11. Such cantilever-like projections 12 can be formed by cutting rectangular portions and bending them inward towards the opposite side walls 8A and 9A. These cantilever-like projections 12 push down and retain the jacket 6A of the optical fiber cable 6 with their undersurfaces 12A when the cable holder 3 is inserted in the holder slot 5 of the housing 2.

The cable holder 3 has detents 13 projecting from the front and rear edges 8B, 8C, 9B, 9C of each side wall 8 or 9 as shown in FIG. 1. These detents 13 will engage the front and rear walls 5Ea, 5Eb of the holder slot 5, thereby preventing the cable holder 3 from coming out from the holder slot 5 in the direction "M" (see FIGS. 7 and 8). The cable holder 3 maybe of metal, and can be provided by stamping out of a metal sheet blank.

In use, first, an optical fiber cable 6 such as all plastic fiber cable is inserted in each cable insertion aperture 4 of the housing 2, and then, the inverted "U"-shaped cable holder 3 is inserted in each holder slot 5. When the cable holder 3 is inserted, its guide surfaces 11A slide on the optical fiber cable 6 until its ramp projections 11 are put on the opposite sides of the optical fiber cable 6 with its opposite bottom edges fitted in the opposite slots 5B, which are defined between the cable stay 5A and either side wall of the holder slot 5, as shown in FIG. 7.

The optical fiber cable 6 on the cable stay 5A is sandwiched between the ramp projections 11, which penetrate the jacket 6A of the optical fiber cable 6, and at the same time, the optical fiber cable. 6 is pushed down and retained by the opposite cantilever-like projections 12. Thus, the optical fiber cable 6 is prevented from moving in the direction "N" in which a pulling force can be applied to the optical fiber cable 6.

Figure 19:
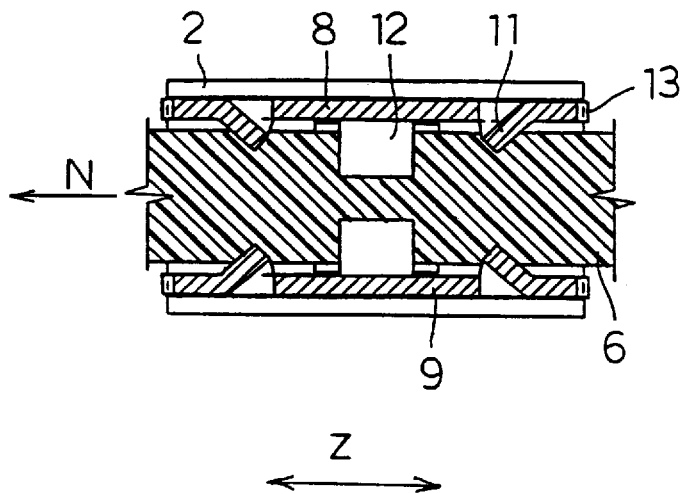
FIG. 19 is a longitudinal section of an optical fiber cable connector according to a second embodiment of the present invention.

FIG. 19 shows only a selected portion of an optical fiber cable connector according to a second embodiment. The selected portion includes features which distinguish the second embodiment from the first embodiment. As shown in FIG. 19, the cable gripping means comprises two pairs of ramp projections 11 arranged back and forth in the longitudinal direction "Z", with both pairs of ramp projections converging toward each other. Specifically, one pair of ramp projections 11 extend in the direction opposite to the direction "N" in which a pulling force can be applied to the optical fiber cable 6. The other pair of ramp projections 11 extend in the pulling direction "N".

Figure 20:
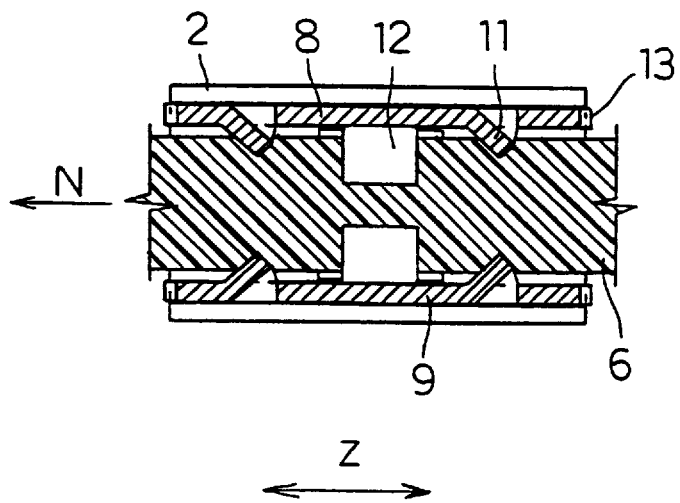
FIG. 20 is a longitudinal section of an optical fiber cable connector according to a third embodiment of the present invention.

FIG. 20 shows a selected portion of an optical fiber cable connector according to a third embodiment. As shown in FIG. 20, both pairs of ramp projections converge in the same direction so that they extend in the direction opposite to the pulling direction "N".

The first, second and third embodiments are described as having two pairs of ramp projections, but the number of pairs may be other than two. The cable holder 3 may be of a plastic molded part.

We claim:

1. An optical fiber cable connector comprising:
   a housing having at least one cable insertion aperture for inserting an optical fiber cable and a holder slot extending along the cable insertion aperture;
   a cable holder comprising a ceiling plate, and two opposite side walls integrally connected to the opposite longitudinal edges of the ceiling plate, each side wall having cable gripping means to engage the optical fiber cable 6 by penetrating the jacket of the optical fiber cable; and
   characterized in the said cable gripping means comprises at least one pair of ramp projections inclined inward in the direction which is opposite to the direction in which the optical fiber cable extends.

2. An optical fiber cable connector to claim 1, wherein said cable gripping means comprises two pairs of ramp projections arranged back and forth in the longitudinal direction, both pairs of ramp projections converging in opposite directions.

3. An optical fiber cable connector according to claim 1, wherein said cable gripping means comprises two pairs of ramp projections arranged back and forth in the longitudinal direction, both pairs of ramp projections converging toward each other.

4. An optical fiber cable connector according to claim 1, wherein said cable gripping means comprises two pairs of ramp projections arranged back and forth in the longitudinal direction, both pairs of ramp projections converging in the same direction.

5. An optical fiber cable connector according to claim 1, wherein said cable holder is made of metal.

6. An optical fiber cable connector according to claim 1, wherein said cable holder is made of plastics.

7. An optical fiber cable connector according to claim 1, wherein each of said projections has a guide surface inclined downward towards its respective side wall.

8. An optical fiber cable connector according to claim 1, wherein said cable holder has projections extending from the front and rear edges of each side wall to be engaged by the front and rear walls of said holder slot, thereby fixing said cable holder in said holder slot.

9. An optical fiber cable connector according to claim 1, wherein said cable holder has at least one pair of cantilever-like projections extending from said opposite side walls engaging the optical fiber cable.

10. An optical fiber cable connector according to claim 1, wherein said optical fiber cable is all plastic fiber cable.

* * * * *